United States Patent
Huang et al.

(10) Patent No.: US 11,387,649 B2
(45) Date of Patent: Jul. 12, 2022

(54) OPERATING CIRCUIT HAVING ESD PROTECTION FUNCTION

(71) Applicant: VANGUARD INTERNATIONAL SEMICONDUCTOR CORPORATION, Hsinchu (TW)

(72) Inventors: Shao-Chang Huang, Hsinchu (TW); Li-Fan Chen, Hsinchu (TW); Ching-Ho Li, Hsinchu (TW); Ting-You Lin, Hsinchu (TW); Chun-Chih Chen, New Taipei (TW); Kai-Chieh Hsu, Taoyuan (TW); Chih-Hsuan Lin, Hsinchu (TW); Yu-Kai Wang, Hsinchu (TW)

(73) Assignee: Vanguard International Semiconductor Corporation, Hsinchu (TW)

( * ) Notice: Subject to any disclaimer, the term of this patent is extended or adjusted under 35 U.S.C. 154(b) by 125 days.

(21) Appl. No.: 16/567,591

(22) Filed: Sep. 11, 2019

(65) Prior Publication Data

US 2021/0075215 A1 Mar. 11, 2021

(51) Int. Cl.
*H02H 9/04* (2006.01)
*H02H 1/00* (2006.01)

(52) U.S. Cl.
CPC .......... *H02H 9/046* (2013.01); *H02H 1/0007* (2013.01)

(58) Field of Classification Search
CPC .......... H02H 9/04; H02H 9/041; H02H 9/046; H01L 21/0248–0296; H01L 21/092; H01L 21/0629; H03K 17/0822

(Continued)

(56) References Cited

U.S. PATENT DOCUMENTS 6,297,624 B1 * 10/2001 Mitsui ............... G05F 1/465
  323/314
7,760,477 B1 * 7/2010 Watt ................. H02H 9/046
  361/56

(Continued)

FOREIGN PATENT DOCUMENTS

CN   110504251   *   5/2018   ............. H01L 27/02
CN   109872991 A      6/2019
(Continued)

OTHER PUBLICATIONS

Taiwanese Office Action and Search Report dated May 1, 2020 for Application No. 108125905.

*Primary Examiner* — Thienvu V Tran
*Assistant Examiner* — Nusrat Quddus
(74) *Attorney, Agent, or Firm* — Birch, Stewart, Kolasch & Birch, LLP (57) ABSTRACT

An operating circuit is provided. A first N-type transistor determines whether to create an open circuit between a core circuit and a ground terminal according to the voltage level of a specific node. An electrostatic discharge (ESD) protection circuit is coupled between an input/output pad and the core circuit to prevent an ESD current from passing through the core circuit. The ESD protection circuit includes a detection circuit and a releasing element. The detection circuit determines whether there is an ESD event at the input/output pad and generates a first detection signal according to the detection of the ESD event at the input/output pad. The releasing element provides a release path according to the first detection signal to release the ESD current. A control circuit controls the voltage level of the specific node according to the first detection signal.

11 Claims, 5 Drawing Sheets

(58) Field of Classification Search
USPC .................. 361/56, 158, 91.1, 111; 323/311, 323/271–289
See application file for complete search history.

(56) References Cited

U.S. PATENT DOCUMENTS

| | | | |
|---|---|---|---|
| 7,764,476 B2 | 7/2010 | Ker et al. | |
| 7,911,752 B1* | 3/2011 | Lin | H02H 9/046 361/56 |
| 8,072,721 B2* | 12/2011 | Kwong | H03K 19/018557 361/56 |
| 8,797,698 B2* | 8/2014 | Lai | H02H 9/046 361/56 |
| 8,958,187 B2* | 2/2015 | Parthasarathy | H02H 9/041 361/56 |
| 9,293,912 B2* | 3/2016 | Parthasarathy | H02H 9/046 |
| 10,056,897 B1* | 8/2018 | Chuang | H03K 19/018521 |
| 10,164,627 B1* | 12/2018 | Chuang | H03K 17/6871 |
| 10,177,135 B2* | 1/2019 | Huang | H01L 27/0266 |
| 10,523,002 B2* | 12/2019 | Huang | H01L 27/0266 |
| 10,714,934 B2* | 7/2020 | Hsu | H01L 27/0285 |
| 11,088,541 B2* | 8/2021 | Huang | H01L 27/0285 |
| 2006/0114629 A1* | 6/2006 | Wu | H01L 27/0266 361/56 |
| 2007/0285854 A1* | 12/2007 | Rodgers | H02H 3/006 361/56 |
| 2008/0106834 A1* | 5/2008 | Hung | H02H 9/046 361/56 |
| 2008/0137251 A1* | 6/2008 | Lin | G11C 17/18 361/91.1 |
| 2008/0165459 A1* | 7/2008 | Holly | H02H 9/046 361/56 |
| 2008/0197415 A1* | 8/2008 | Yun | H02H 9/046 257/355 |
| 2008/0198520 A1* | 8/2008 | Yun | H02H 9/046 361/56 |
| 2008/0204952 A1* | 8/2008 | Hung | H02H 9/046 361/56 |
| 2008/0297960 A1* | 12/2008 | Chen | H01L 27/0285 361/56 |
| 2008/0316660 A1* | 12/2008 | Huang | H02H 9/046 361/56 |
| 2009/0168280 A1* | 7/2009 | Huang | H02H 9/046 361/56 |
| 2009/0310266 A1* | 12/2009 | Etherton | G11C 17/18 361/56 |
| 2010/0259858 A1* | 10/2010 | Huang | G11C 16/30 361/56 |
| 2011/0063762 A1* | 3/2011 | Lee | H02H 9/046 361/56 |
| 2013/0027821 A1* | 1/2013 | Chen | H02H 9/046 361/56 |
| 2013/0182359 A1* | 7/2013 | Jeon | H02H 9/044 361/56 |
| 2014/0268441 A1* | 9/2014 | Mallikarjunaswamy | H03K 17/08104 361/56 |
| 2014/0286085 A1* | 9/2014 | Miyakawa | G11C 5/147 365/158 |
| 2015/0049403 A1* | 2/2015 | de Raad | H01L 27/0285 361/56 |
| 2015/0070804 A1* | 3/2015 | de Raad | H01L 29/78 361/56 |
| 2015/0214732 A1* | 7/2015 | Haruki | H02H 9/042 361/56 |
| 2015/0311700 A1* | 10/2015 | Lee | H02H 9/04 361/56 |
| 2015/0338931 A1* | 11/2015 | Teh | G06F 3/0317 345/166 |
| 2017/0170165 A1* | 6/2017 | Chen | H01L 27/0629 |
| 2017/0179714 A1* | 6/2017 | Braun | H02H 1/04 |
| 2018/0019741 A1* | 1/2018 | Huang | H03K 17/0822 |
| 2018/0247927 A1* | 8/2018 | Lai | H02H 9/04 |
| 2019/0165571 A1* | 5/2019 | Batra | H02H 9/046 |
| 2019/0372562 A1* | 12/2019 | Lee | H03K 19/20 |
| 2020/0036376 A1* | 1/2020 | Lin | H02H 9/046 |
| 2020/0083704 A1* | 3/2020 | Huang | H01L 27/0285 |
| 2020/0185913 A1* | 6/2020 | Narita | H01L 27/0285 |
| 2020/0220536 A1* | 7/2020 | Lee | H03K 17/223 |
| 2020/0235089 A1* | 7/2020 | Stockinger | H01L 27/0266 |
| 2021/0135451 A1* | 5/2021 | Chao | H01L 27/0266 |
| 2021/0151977 A1* | 5/2021 | Kumar | H02H 3/20 |
| 2021/0167180 A1* | 6/2021 | Kar | H01L 29/086 |

FOREIGN PATENT DOCUMENTS

| | | |
|---|---|---|
| TW | 200536098 A | 11/2005 |
| TW | I357652 B | 2/2012 |
| TW | I406385 B1 | 8/2013 |
| TW | 201533880 A | 9/2015 |
| TW | I662682 B | 6/2019 |

* cited by examiner

FIG. 5

OPERATING CIRCUIT HAVING ESD PROTECTION FUNCTION

BACKGROUND OF THE INVENTION

Field of the Invention

The invention relates to an operating circuit, and more particularly to an operating circuit that has an electrostatic discharge (ESD) protection function.

Description of the Related Art

As the semiconductor manufacturing process develops, an electrostatic discharge (ESD) protection has become one of the most critical reliability issues for integrated circuits (IC). In particular, as semiconductor processing advances into the deep sub-micron stage, scaled-down devices and thinner gate oxides are more vulnerable to ESD stress.

BRIEF SUMMARY OF THE INVENTION

In accordance with an embodiment, an operating circuit is coupled between an input/output pad and a ground terminal and comprises a core circuit, a first N-type transistor, an electrostatic discharge (ESD) protection circuit and a control circuit. The first N-type transistor determines whether to create an open circuit between the core circuit and the ground terminal, according to the voltage level of a specific node. The ESD protection circuit is coupled between the input/output pad and the core circuit to prevent an ESD current from flowing into the core circuit. The ESD protection circuit comprises a detection circuit and a releasing element. The detection circuit determines whether there is an ESD event at the input/output pad and generates a first detection signal according to the detection of the ESD event at the input/output pad. The releasing element provides a release path according to the first detection signal to release the ESD current. The control circuit controls the voltage level of the specific node according to the first detection signal.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

Figure 1:
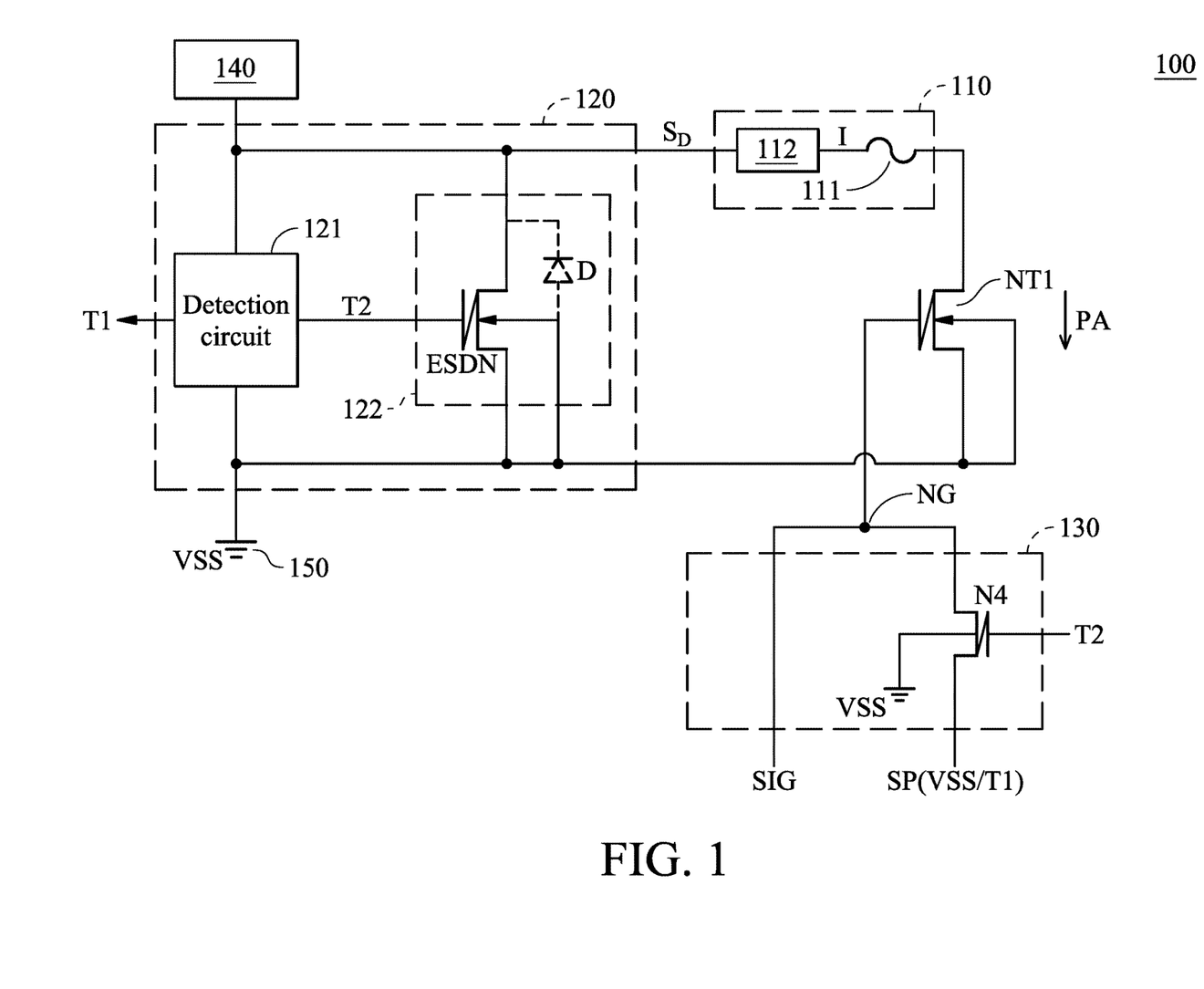
FIG. 1 is a schematic diagram of an exemplary embodiment of an operating circuit, according to various aspects of the present disclosure.

FIG. 1 is a schematic diagram of an exemplary embodiment of an operating circuit, according to various aspects of the present disclosure. As shown in FIG. 1, the operating circuit 100 comprises a core circuit 110, an N-type transistor NT1, an electrostatic discharge (ESD) protection circuit 120 and a control circuit 130. The core circuit 110 is controlled by the control circuit 130. FIG. 1 only shows a portion of the control circuit 130, which related to the invention, but the invention is not limited thereto. The control circuit 130 still may comprise other hardware devices for controlling the hardware, which are not discussed for brevity. In the present disclosure, the structure of the core circuit 110 is not limited. Any circuit can serve as the core circuit 110, as long as the circuit may be affected by an ESD current.

In one embodiment, the core circuit 110 comprises a fuse 111 and an internal circuit 112. The internal circuit 112 is configured to program the fuse 111. The connection relationship between the fuse 111 and the internal circuit 112 is not limited in the present disclosure. In this embodiment, the internal circuit 112 is coupled between the ESD protection circuit 120 and the fuse 111, and the fuse 111 is coupled between the internal circuit 112 and the N-type transistor NT1. In other embodiments, the fuse 111 may be coupled between the ESD protection circuit 120 and the N-type transistor NT1.

When no ESD event occurs, the internal circuit 112 may receive a driving signal $S_D$ via the input/output pad 140 and generate a current I according to the driving signal $S_D$ to program the fuse 111. When the fuse 111 is programmed, the fuse 111 may be blown from a first state to a second state. For example, when the current I passes through the fuse 111, the fuse 111 may be blown. Therefore, the state of the fuse 111 is at an open state from a closed state. In another embodiment, the fuse 111 may be blown and the state of the fuse 111 is at a closed state from an open state.

However, when an ESD event occurs at the input/output pad 140, the internal circuit 112 may be damaged by the ESD current from the input/output pad 140. Additionally, the internal circuit 112 may false program the fuse 111 due to the ESD current. The fuse 111 may be blown inappropriately causing the internal circuit 112 malfunction. In this embodiment, when the ESD event occurs, the control circuit 130 is activated to prevent the fuse from blowing inappropriately.

The N-type transistor NT1 turns on or off the path PA between the core circuit 110 and the ground terminal 150 according to the voltage level of a specific node NG. For example, when the voltage level of the specific node NG is at a high level (e.g., 5V), the N-type transistor NT1 is turned on such that the path PA is turned on. Therefore, the core circuit 110 is coupled to the ground terminal 150 via the path PA. However, when the voltage level of the specific node NG is at a low level (e.g., 0V), the N-type transistor NT1 is turned off such that the path PA is turned off. Therefore, the core circuit 110 does not electrically couple to the ground terminal 150.

In this embodiment, the gate of the N-type transistor NT1 is coupled to the specific node NG, the drain of the N-type transistor NT1 is coupled to the core circuit 110, and the source and the bulk of the N-type transistor NT1 are coupled to the ground terminal 150. When an ESD event occurs at the input/output pad 140, the N-type transistor NT1 is turned off such that the ESD current does not pass through the core circuit 110.

The ESD protection circuit 120 is coupled between the input/output pad 140 and the core circuit 110 to prevent the ESD current from passing through the core circuit 110. The structure of the ESD protection circuit 120 is not limited in the present disclosure. Any circuit can serve as the ESD protection circuit 120, as long as the circuit is capable of avoiding the ESD current to pass through the core circuit 110 and does not affect the operation of the core circuit 110. In this embodiment, the ESD protection circuit 120 comprises a detection circuit 121 and a releasing element 122. The detection circuit 121 is configured to detect whether there is an ESD event at the input/output pad 140 and generates a detection signal T2 according to the detection of the ESD event at the input/output pad 140. For example, when there is an ESD event at the input/output pad 140 and the ground terminal 150 receives a ground level VSS, the detection signal T2 is at a specific level, such as a high level. When no ESD event occurs, the detection signal T2 does not at the specific level. At this time, the detection signal T2 may be at a low level.

In other embodiments, the detection circuit 121 further generates another detection signal T1. The detection signal T1 is the opposite of the detection signal T2. For example, when the detection signal T1 is at a high level, the detection signal T2 is at a low level. When the detection signal T1 is at the low level, the detection signal T2 is at the high level. The structure of the detection circuit 121 is not limited in the present disclosure. The operating configuration of the detection circuit 121 is described in greater detail with reference to FIGS. 4 and 5.

The releasing element 122 provides a release path according to the detection signal T2 to release the ESD current. For example, when an ESD event occurs at the input/output pad 140 and the ground terminal 150 receives the ground level VSS, the detection signal T2 is at the specific level. Therefore, the releasing element 122 is turned on to release the ESD current from the input/output pad 140 to the ground terminal 150. When no ESD event occurs, the releasing element 122 is turned off.

In the present disclosure, the kind of releasing element 122 is not limited. In one embodiment, the releasing element 122 is an N-type transistor ESDN. The gate of the N-type transistor ESDN is coupled to the node ND2. The first source/drain of the N-type transistor ESDN is coupled to the input/output pad 140. The second source/drain and the bulk of the N-type transistor ESDN is coupled to the ground terminal 150.

When an ESD event occurs at the input/output pad 140 and the ground terminal 150 receives the ground level, the N-type transistor ESDN is turned on. At this time, if the input/output pad 140 receives a positive ESD voltage, the N-type transistor ESDN releases the ESD current from the input/output pad 140 to the ground terminal 150. If the input/output pad 140 receives an negative ESD voltage, the parasitic diode D between the drain and the bulk of the N-type transistor ESDN releases the ESD current from the ground terminal 150 to the input/output pad 140.

The control circuit 130 controls the voltage level of the specific node NG according to the detection signal T2. For example, when the detection signal T2 is at the specific level, it means that an ESD event occurs. Therefore, the control circuit 130 sets the voltage level of the specific node NG to be equal to a predetermined level SP. In one embodiment, the predetermined level SP is equal to the ground level VSS. In another embodiment, the predetermined level SP is equal to the level of the detection signal T1. However, when the detection signal T2 does not at the specific level, it means no ESD event. Therefore, the control circuit 130 provides a specific signal SIG to the specific node NG.

In this embodiment, the control circuit 130 comprises an N-type transistor N4. The gate of the N-type transistor N4 receives the detection signal T2. The drain of the N-type transistor N4 is coupled to the specific node NG. The source of the N-type transistor N4 receives the predetermined level SP. The bulk of the N-type transistor N4 receives the ground level VSS. When the detection signal T2 is at the specific level, the N-type transistor N4 is turned on to transmit the predetermined level SP to the specific node NG. When the detection signal T2 does not at the specific level, the N-type transistor N4 is turned off to stop transmitting the predetermined level SP to the specific node NG. At this time, the control circuit 130 transmits the specific signal SIG to the specific node NG. In one embodiment, the specific signal SIG is generated by a signal generating circuit (not shown).

Figure 2:
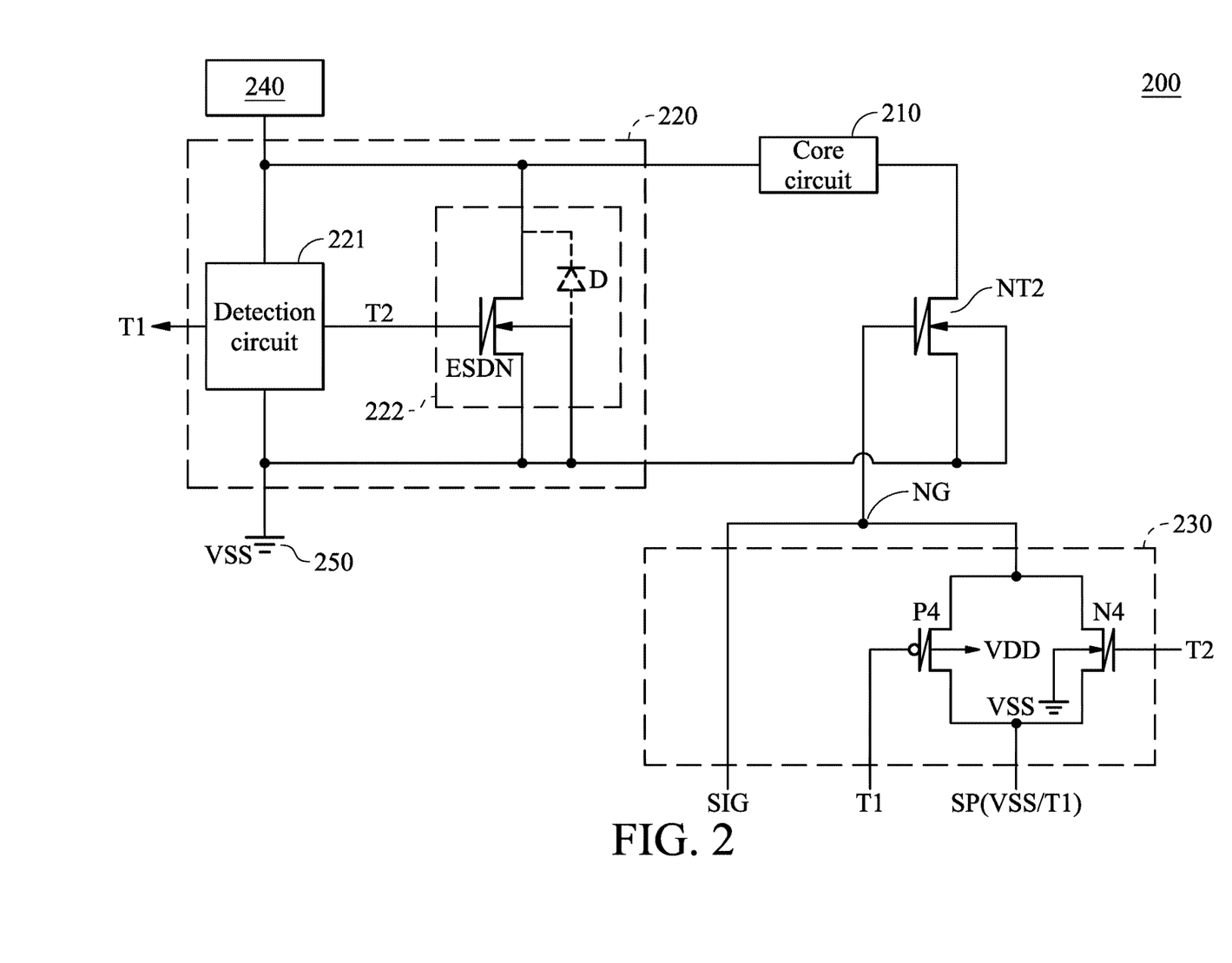
FIG. 2 is a schematic diagram of another exemplary embodiment of the operating circuit, according to various aspects of the present disclosure.

FIG. 2 is a schematic diagram of another exemplary embodiment of the operating circuit, according to various aspects of the present disclosure. The operating circuit 200 comprises a core circuit 210, an N-type transistor NT2, an ESD protection circuit 220 and a control circuit 230. The ESD protection circuit 220 is coupled to the input/output pad 240 and the ground terminal 250. The ground terminal 250 receives the ground level VSS. Since the features of the core circuit 210, the N-type transistor NT2 and the ESD protection circuit 220 are the same as the features of the core circuit 110, the N-type transistor NT1 and the ESD protection circuit 120, the descriptions of the core circuit 210, the N-type transistor NT2 and the ESD protection circuit 220 are omitted.

In this embodiment, the control circuit 230 shown in FIG. 2 is similar to the control circuit 120 of FIG. 1 except for the addition of a P-type transistor P4. As shown in FIG. 2, the P-type transistor P4 is connected to the N-type transistor N4 in parallel and sets the voltage level of the specific node NG according to the detection signal T1. Since the detection signal T2 is the opposite of the detection signal T1, when the N-type transistor N4 is turned on, the P-type transistor P4 is also turned on. Therefore, the N-type transistor N4 and the P-type transistor P4 transmit the predetermined level SP to the specific node NG. When the N-type transistor N4 is turned off, the P-type transistor P4 is also turned off. Therefore, the N-type transistor N4 and the P-type transistor P4 stop transmitting the predetermined level SP to the specific node NG.

In this embodiment, the gate of the P-type transistor P4 receives the detection signal T1. The first source/drain of the P-type transistor P4 is coupled to the specific node NG. The second source/drain of the P-type transistor P4 receives the predetermined level SP. The bulk of the P-type transistor P4 receives an operating voltage VDD. In one embodiment, the operating voltage VDD is higher than the ground level VSS.

Figure 3:
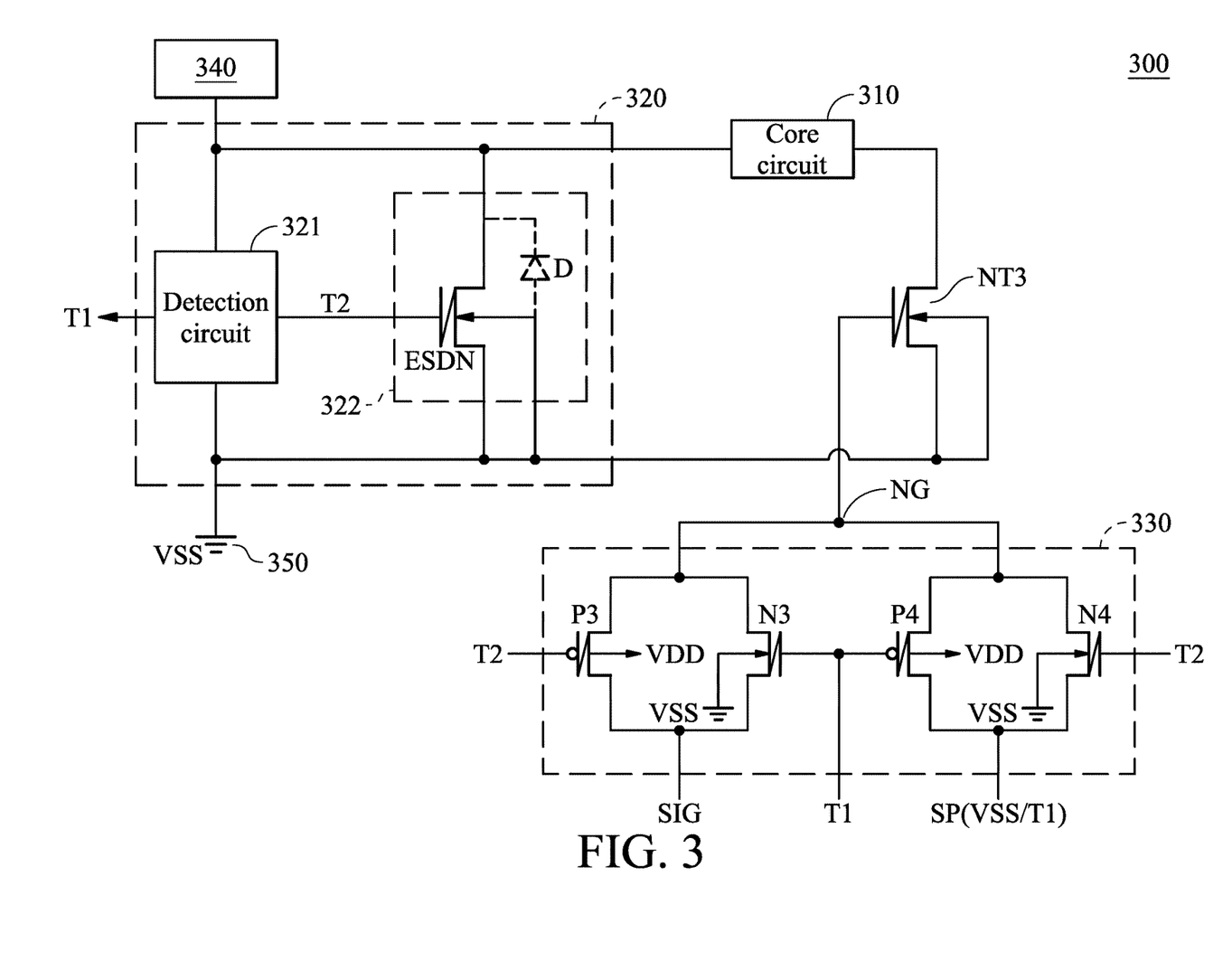
FIG. 3 is a schematic diagram of another exemplary embodiment of the operating circuit, according to various aspects of the present disclosure.

FIG. 3 is a schematic diagram of another exemplary embodiment of the operating circuit, according to various aspects of the present disclosure. The operating circuit 300 comprises a core circuit 310, an N-type transistor NT3, an ESD protection circuit 320 and a control circuit 330. The ESD protection circuit 320 is coupled to the input/output pad 340 and the ground terminal 350. The ground terminal 350 receives the ground level VSS. Since the features of the core circuit 310, the N-type transistor NT3 and the ESD protection circuit 320 are the same as the features of the core circuit 110, the N-type transistor NT1 and the ESD protection circuit 120, the descriptions of the core circuit 310, the N-type transistor NT3 and the ESD protection circuit 320 are omitted.

The control circuit 330 of FIG. 3 is similar to the control circuit 230 of FIG. 2 except for the addition of an N-type transistor N3 and a P-type transistor P3. The N-type transistor N3 is coupled between the specific node NG and a signal generating circuit (not shown) and determines whether to transmit the specific signal SIG to the specific node NG according to the detection signal T1. As shown in FIG. 3, the gate of the N-type transistor N3 receives the detection signal T1. The first source/drain of the N-type transistor N3 is coupled to the specific node NG. The second source/drain of the N-type transistor N3 receives the specific signal SIG. The bulk of the N-type transistor N3 receives the ground level VSS.

The P-type transistor P3 is connected to the N-type transistor N3 in parallel and determines whether to transmit the specific signal SIG to the specific node NG according to the detection signal T2. As shown in FIG. 3, the gate of the P-type transistor P3 receives the detection signal T2. The first source/drain of the P-type transistor P3 is coupled to the specific node NG. The second source/drain of the P-type transistor P3 receives the specific signal SIG. The bulk of the P-type transistor P3 receives the operating voltage VDD.

In this embodiment, since the detection signal T2 is the opposite of the detection signal T1, when the N-type transistor N3 is turned on, the P-type transistor P3 is also turned on. Therefore, the N-type transistor N3 and the P-type transistor P3 transmit the specific signal SIG to the specific node NG. When the N-type transistor N3 is turned off, the P-type transistor P3 is also turned off. Therefore, the N-type transistor N3 and the P-type transistor P3 stop transmitting the specific signal SIG to the specific node NG.

In other embodiments, when the N-type transistor N4 is turned on, the N-type transistor N3 is turned off. Therefore, the voltage level of the specific node NG is equal to the ground level VSS. When the N-type transistor N4 is turned off, the N-type transistor N3 is turned on. Therefore, the voltage level of the specific node NG is equal to the specific signal SIG.

Figure 4:
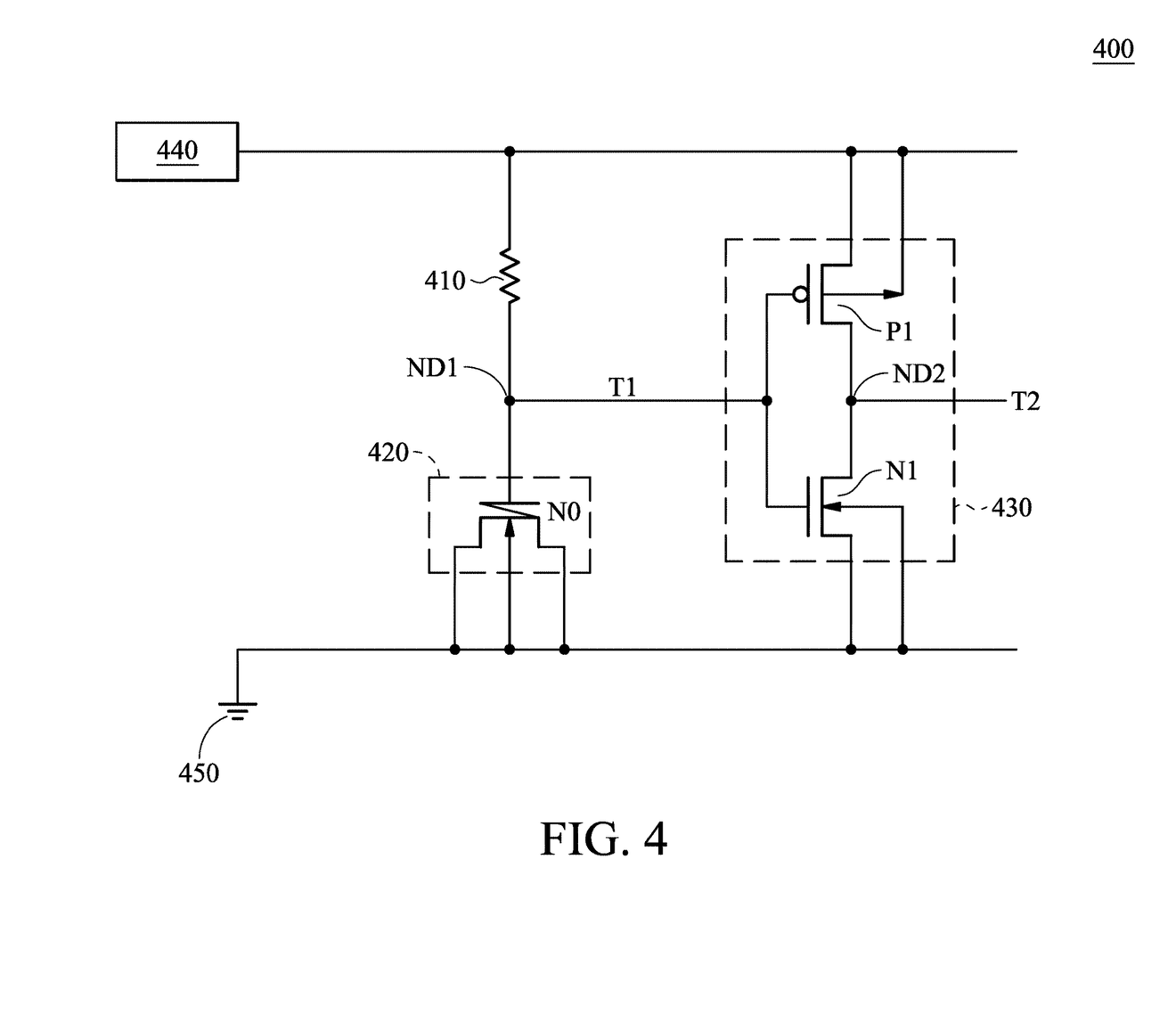
FIG. 4 is a schematic diagram of an exemplary embodiment of a detection circuit, according to various aspects of the present disclosure.

FIG. 4 is a schematic diagram of an exemplary embodiment of a detection circuit, according to various aspects of the present disclosure. The detection circuit 400 comprises a resistor 410, a capacitor 420 and an inverter 430. The resistor 410 is coupled between the input/output pad 440 and the node ND1. The capacitor 420 is coupled between the node ND1 and the ground terminal 450. In this embodiment, the capacitor 420 is an N-type transistor N0. As shown in FIG. 4, the gate of the N-type transistor N0 is coupled to the node ND1. The source, the drain and the bulk of the N-type transistor N0 are coupled to the ground terminal 450. In one embodiment, the ground terminal 450 receives the ground level VSS.

When an ESD event occurs at the input/output pad 440 and the ground terminal 450 receives the ground level VSS, the voltage level of the node ND1 is a low level, which may be equal to the ground level VSS due to the characteristic of the capacitor 420. However, when there is no ESD event at the input/output pad 440, and if the input/output pad 440 receives a first operating voltage (e.g., 5V) and the ground terminal 450 receives the ground level VSS, then the node ND1 is at a high level, such as 5V. In this embodiment, the voltage level of the node ND1 serves as the detection signal T1.

The inverter 430 inverts the voltage level of the detection signal T1 to generate the detection signal T2. Therefore, the detection signal T2 (referred to as a first detection signal) is the opposite of the detection signal T1 (referred to as a second detection signal). In this embodiment, the inverter 430 comprises a P-type transistor P1 and an N-type transistor N1.

The gate of the P-type transistor P1 is coupled to the node ND1. The first source/drain and the bulk of the P-type transistor P1 are coupled to the input/output pad 440. The second source/drain of the P-type transistor P1 is coupled to the node ND2. The gate of the N-type transistor N1 is coupled to the node ND1. The first source/drain of the N-type transistor N1 is coupled to the node ND2. The second source/drain and the bulk of the N-type transistor N1 are coupled to the ground terminal 450. In this embodiment, the voltage level of the node ND2 serves as the detection signal T2.

In an normal mode (not ESD event), the input/output pad 440 receives a first operating voltage (e.g., 5V) and the ground terminal 450 receives a second operating voltage (e.g., 0V). The first operating voltage may be higher than the second operating voltage. In this case, the detection signal T1 is approximately equal to the first operating voltage. Therefore, the N-type transistor N1 is turned on such that the detection signal T2 is approximately equal to the second operating voltage.

In a protection mode (occurring ESD event), the input/output pad 440 receives an ESD voltage and the ground terminal 450 receives the ground level (e.g., 0V). In this case, the detection signal T1 is approximately equal to the ground level. Therefore, the P-type transistor P1 is turned on such that the detection signal T2 is at a high level (i.e., the predetermined level). At this time, a releasing element (e.g., the releasing element 122 in FIG. 1) disposed outside of the detection circuit 400 is turned on to release the ESD current from the input/output pad 440 to the ground terminal 450 to prevent the ESD current entering the core circuit.

Figure 5:
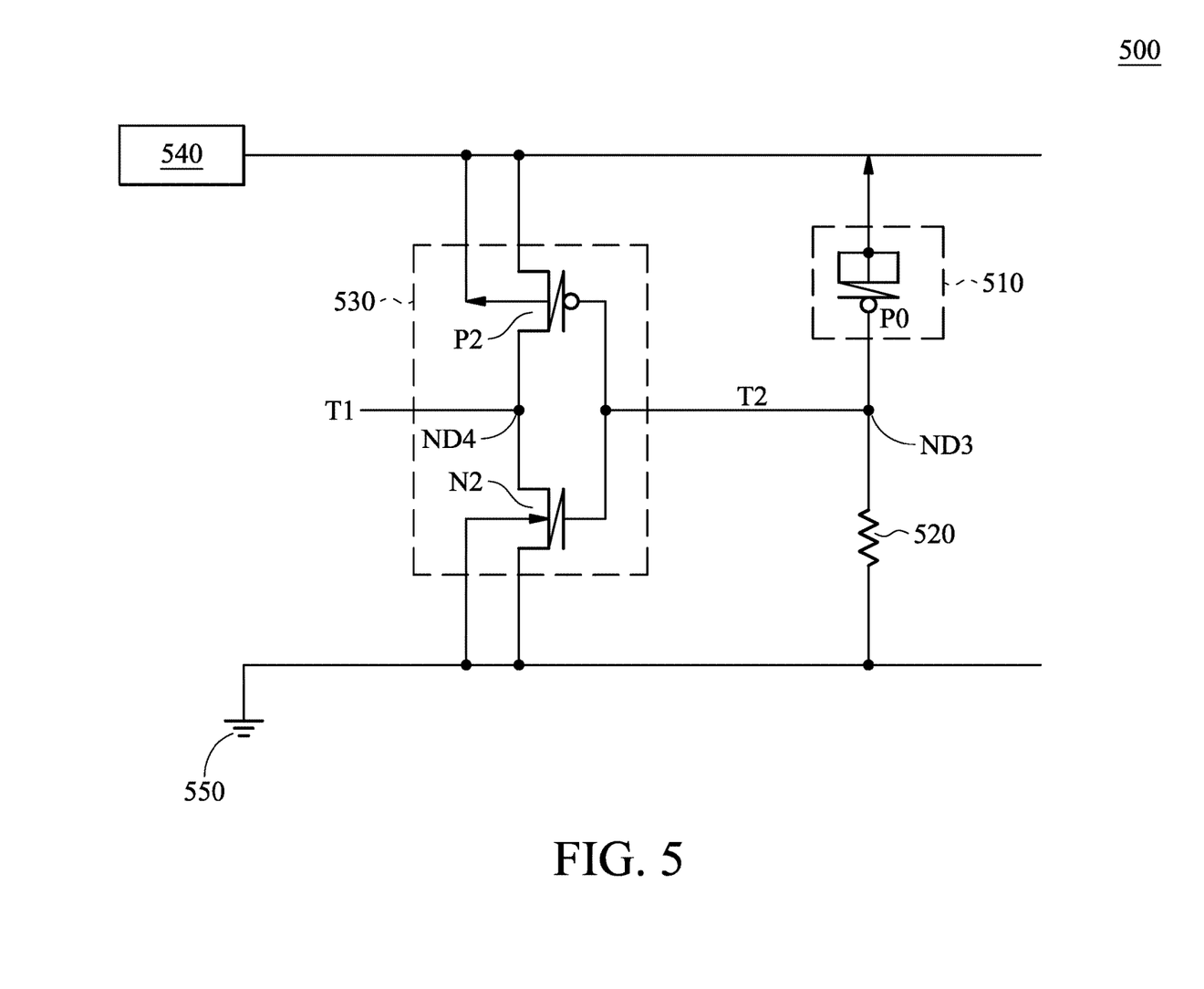
FIG. 5 is a schematic diagram of another exemplary embodiment of the detection circuit, according to various aspects of the present disclosure.

FIG. 5 is a schematic diagram of another exemplary embodiment of the detection circuit, according to various aspects of the present disclosure. The detection circuit 500 comprises a capacitor 510, a resistor 520 and an inverter 530. The capacitor 510 is coupled between the input/output pad 540 and the node ND3. In this embodiment, the capacitor 510 is a P-type transistor P0. The gate of the P-type transistor P0 is coupled to the node ND3. The source, the drain and the bulk of the P-type transistor P0 are coupled to the input/output pad 540. The resistor 520 is coupled between the node ND3 and the ground terminal 550. In this embodiment, the voltage level of the node ND3 is served as the detection signal T2.

The inverter 530 inverts the voltage level of the detection signal T2 to generate the detection signal T1. In this embodiment, the inverter 530 comprises a P-type transistor P2 and an N-type transistor N2. The gate of the P-type transistor P2 is coupled to the node ND3. The first source/drain and the bulk of the P-type transistor P2 are coupled to the input/output pad 540. The second source/drain of the P-type transistor P2 is coupled to the node ND4. The gate of the N-type transistor N2 is coupled to the node ND3. The first source/drain of the N-type transistor N2 is coupled to the node ND4. The second source/drain and the bulk of the N-type transistor N2 are coupled to the ground terminal 550.

In a normal mode (not ESD event), the input/output pad 540 receives a first operating voltage (e.g., 5V) and the ground terminal 550 receives a second operating voltage (e.g., 0V), wherein the first operating voltage is higher than the second operating voltage. At this time, the detection signal T2 is approximately equal to the second operating voltage. Therefore, the P-type transistor P2 is turned on such that the detection signal T1 is approximately equal to the first operating voltage.

In a protection mode (occurring an ESD event), the input/output pad 540 receives an ESD voltage and the ground terminal 550 receives the ground level. In such cases, the detection signal T2 is at a high level, which may be referred to as a predetermined level. Therefore, the N-type transistor N2 is turned on such that the detection signal T1 is at a low level.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). For example, it should be understood that the system, device and method may be realized in software, hardware, firmware, or any combination thereof. Therefore, the scope of the appended claims should be accorded the broadest interpretation so as to encompass all such modifications and similar arrangements.

What is claimed is:

1. An operating circuit coupled between an input/output pad and a ground terminal and comprising:
    a core circuit;
    a first N-type transistor determining whether to create an open circuit between the core circuit and the ground terminal according to a voltage level of a specific node;
    an electrostatic discharge (ESD) protection circuit coupled between the input/output pad and the core circuit to prevent an ESD current from passing through the core circuit and comprising:
    a detection circuit determining whether there is an ESD event at the input/output pad and generating a first detection signal according to the detection of the ESD event at the input/output pad; and
    a releasing element providing a release path according to the first detection signal to release the ESD current; and
    a control circuit controlling the voltage level of the specific node according to the first detection signal,
    wherein in response to the ESD event occurring at the input/output pad, the first N-type transistor is turned off to create the open circuit between the core circuit and the ground terminal such that the core circuit does not electrically couple to the ground terminal,
    wherein the core circuit comprises:
        a fuse; and
        an internal circuit, wherein in response to the internal circuit receiving a driving signal via the input/output pad, the internal circuit generates a current according to the driving signal, and in response to the current passing through the fuse, the fuse is programmed,
    wherein a source of the first N-type transistor is directly connected to the ground terminal,
    wherein the detection circuit further generates a second detection signal which is the opposite of the first detection signal,
    wherein the control circuit comprises:
        a first transistor setting the voltage level of the specific node to turn off the first N-type transistor in response to the ESD event occurring at the input/output pad;
        a second transistor coupled to the first transistor in parallel and setting the voltage level of the specific node according to the second detection signal;
        a third transistor coupled to the specific node and determining whether to transmit a specific signal to the specific node according to the second detection signal; and
        a fourth transistor coupled to the specific node and determining whether to transmit the specific signal to the specific node according to the first detection signal,
    wherein in response to the first transistor being turned on, the second transistor is also turned on, and in response to the first transistor being turned off, the second transistor is turned off, and
    wherein in response to the third transistor being turned on, the fourth transistor is also turned on, and in response to the third transistor being turned off, the fourth transistor is turned off.

2. The operating circuit as claimed in claim 1, wherein in response to the ESD event occurring at the input/output pad, the first N-type transistor is turned off to create the open circuit between the core circuit and the ground terminal.

3. The operating circuit as claimed in claim 1, wherein the first transistor sets the voltage level of the specific node to be equal to a ground level according to the first detection signal.

4. The operating circuit as claimed in claim 1, wherein the first transistor sets the voltage level of the specific node to be equal to the second detection signal.

5. The operating circuit as claimed in claim 1, wherein in response to the first transistor being turned on, the third transistor is turned off, and in response to the first transistor being turned off, the third transistor is turned on.

6. The operating circuit as claimed in claim 1, wherein the detection circuit comprises:
    a resistor coupled between the input/output pad and a first node;
    a capacitor coupled between the first node and the ground terminal, wherein a voltage level of the first node serves as the second detection signal; and
    an inverter inverting the second detection signal to generate the first detection signal.

7. The operating circuit as claimed in claim 6, wherein the capacitor is a second N-type transistor, a gate of the second N-type transistor is coupled to the first node, and a source and a drain of the second N-type transistor are coupled to the ground terminal.

8. The operating circuit as claimed in claim 7, wherein the inverter comprises:
    a P-type transistor comprising a first gate, a first source/drain and a second source/drain, wherein the first gate is coupled to the first node, the first source/drain is coupled to the input/output pad and the second source/drain is coupled to a second node; and
    a third N-type transistor comprising a second gate, a third source/drain and a fourth source/drain, wherein the second gate is coupled to the first node, the third source/drain is coupled to the second node, and the fourth source/drain is coupled to the core circuit.

9. The operating circuit as claimed in claim 1, wherein the detection circuit comprises:

a capacitor coupled between the input/output pad and a first node;

a resistor coupled between the first node and the ground terminal, wherein a voltage level of the first node serves as the first detection signal; and an inverter inverting the first detection signal to generate the second detection signal.

10. The operating circuit as claimed in claim 9, wherein the capacitor is a first P-type transistor, a gate of the first P-type transistor is coupled to the first node, and a source and a drain of the first P-type transistor are coupled to the input/output pad.

11. The operating circuit as claimed in claim 10, wherein the inverter comprises:

a second P-type transistor comprising a first gate, a first source/drain and a second source/drain, wherein the first gate is coupled to the first node, the first source/drain is coupled to the input/output pad, and the second source/drain is coupled to a second node; and a second N-type transistor comprising a second gate, a third source/drain and a fourth source/drain, wherein the second gate is coupled to the first node, the third source/drain is coupled to the second node, and the fourth source/drain is coupled to the ground terminal.

* * * * *